(12) United States Patent
Takaiwa

(10) Patent No.: US 9,167,172 B2
(45) Date of Patent: Oct. 20, 2015

(54) IMAGE CAPTURE APPARATUS AND METHOD OF CONTROLLING THE SAME

(75) Inventor: Kan Takaiwa, Hachioji (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 121 days.

(21) Appl. No.: 13/558,893

(22) Filed: Jul. 26, 2012

(65) Prior Publication Data

US 2013/0057740 A1    Mar. 7, 2013

(30) Foreign Application Priority Data

Sep. 1, 2011 (JP) ................................ 2011-191070

(51) Int. Cl.
*H04N 5/235* (2006.01)
*H04N 5/355* (2011.01)
*H04N 5/369* (2011.01)

(52) U.S. Cl.
CPC ......... *H04N 5/2354* (2013.01); *H04N 5/35554* (2013.01); *H04N 5/3696* (2013.01)

(58) Field of Classification Search
USPC ............... 348/222.1, 229.1–230.1, 234–238, 348/294–324, 345–357, 362–368, 348/370–371; 396/61–70, 155–206, 396/213–262
See application file for complete search history.

(56) References Cited

U.S. PATENT DOCUMENTS

| | | | | |
|---|---|---|---|---|
| 5,745,175 A * | 4/1998 | Anderson | ...................... | 348/345 |
| 5,890,021 A * | 3/1999 | Onoda | ........................... | 396/121 |
| 6,411,782 B1 * | 6/2002 | Kindaichi | .................... | 396/196 |
| 6,665,010 B1 * | 12/2003 | Morris et al. | .................. | 348/297 |
| 6,693,673 B1 * | 2/2004 | Tanaka et al. | .................. | 348/371 |
| 7,522,210 B2 * | 4/2009 | Shimada | ........................ | 348/364 |
| 7,751,701 B2 * | 7/2010 | Endo | .............................. | 396/123 |
| 8,294,785 B2 * | 10/2012 | Chou et al. | ................. | 348/230.1 |
| 8,441,535 B2 * | 5/2013 | Morin | ........................... | 348/148 |
| 2001/0019364 A1 * | 9/2001 | Kawahara | ..................... | 348/362 |
| 2003/0025821 A1 * | 2/2003 | Bean et al. | ..................... | 348/345 |
| 2003/0052991 A1 * | 3/2003 | Stavely et al. | ................ | 348/370 |

(Continued)

FOREIGN PATENT DOCUMENTS

| | | |
|---|---|---|
| JP | 06-130462 | 5/1994 |
| JP | 09-061913 A | 3/1997 |

(Continued)

OTHER PUBLICATIONS

The above references were cited in a Jun. 5, 2015 Japanese Office Action, which is enclosed without an English Translation, hat issued in Japanese Patent Application No. 2011-191070.

*Primary Examiner* — Michael Osinski
(74) *Attorney, Agent, or Firm* — Cowan, Liebowitz & Latman, P.C.

(57) ABSTRACT

An image capture apparatus comprises an image sensor, an acquisition unit which acquires information concerning distances to objects in a plurality of areas in an image capturing area, and a control unit which controls a charge accumulation period for each of a plurality of segmented areas of the image sensor, wherein the plurality of areas for which information concerning distances to the objects are acquired by the acquisition unit respectively correspond to the plurality of segmented areas, and the control unit controls the charge accumulation periods for the respective segmented areas at the time of light emission by a light-emitting device based on the information concerning the distances to the objects in the corresponding areas.

31 Claims, 12 Drawing Sheets

(56) References Cited

U.S. PATENT DOCUMENTS

| | | | |
|---|---|---|---|
| 2003/0077080 A1* | 4/2003 | Nakata | 396/121 |
| 2003/0107669 A1* | 6/2003 | Ito et al. | 348/370 |
| 2005/0122420 A1* | 6/2005 | Matsui | 348/370 |
| 2005/0128310 A1* | 6/2005 | Egawa | 348/208.12 |
| 2005/0157208 A1* | 7/2005 | Park et al. | 348/371 |
| 2005/0220450 A1* | 10/2005 | Enomoto et al. | 396/104 |
| 2006/0007346 A1* | 1/2006 | Nakamura et al. | 348/362 |
| 2006/0062557 A1* | 3/2006 | Imada | 396/55 |
| 2006/0291844 A1* | 12/2006 | Kakkori | 396/89 |
| 2007/0139548 A1* | 6/2007 | Sugimoto et al. | 348/371 |
| 2007/0212053 A1* | 9/2007 | Koyama | 396/157 |
| 2008/0079819 A1* | 4/2008 | Uchida | 348/229.1 |
| 2008/0080851 A1* | 4/2008 | Endo | 396/157 |
| 2008/0170847 A1* | 7/2008 | Flannery | 396/222 |
| 2008/0253758 A1* | 10/2008 | Yap et al. | 396/234 |
| 2009/0002525 A1* | 1/2009 | Um et al. | 348/241 |
| 2009/0051781 A1* | 2/2009 | Takemura et al. | 348/222.1 |
| 2009/0122181 A1* | 5/2009 | Matsui | 348/370 |
| 2009/0231468 A1* | 9/2009 | Yasuda | 348/234 |
| 2010/0020198 A1* | 1/2010 | Okamoto | 348/231.99 |
| 2010/0033604 A1* | 2/2010 | Solomon | 348/241 |
| 2010/0328488 A1* | 12/2010 | Bamidele et al. | 348/229.1 |
| 2011/0032411 A1* | 2/2011 | Hirai | 348/345 |
| 2011/0097067 A1* | 4/2011 | Osawa | 396/165 |
| 2012/0002081 A1* | 1/2012 | Chou et al. | 348/234 |
| 2012/0069240 A1* | 3/2012 | Osawa | 348/371 |
| 2012/0281133 A1* | 11/2012 | Kurita et al. | 348/362 |
| 2013/0002935 A1* | 1/2013 | Morita | 348/348 |
| 2013/0329128 A1* | 12/2013 | Kaizu et al. | 348/367 |

FOREIGN PATENT DOCUMENTS

| | | |
|---|---|---|
| JP | 2001-021961 | 1/2001 |
| JP | 2006-157862 A | 6/2006 |

* cited by examiner

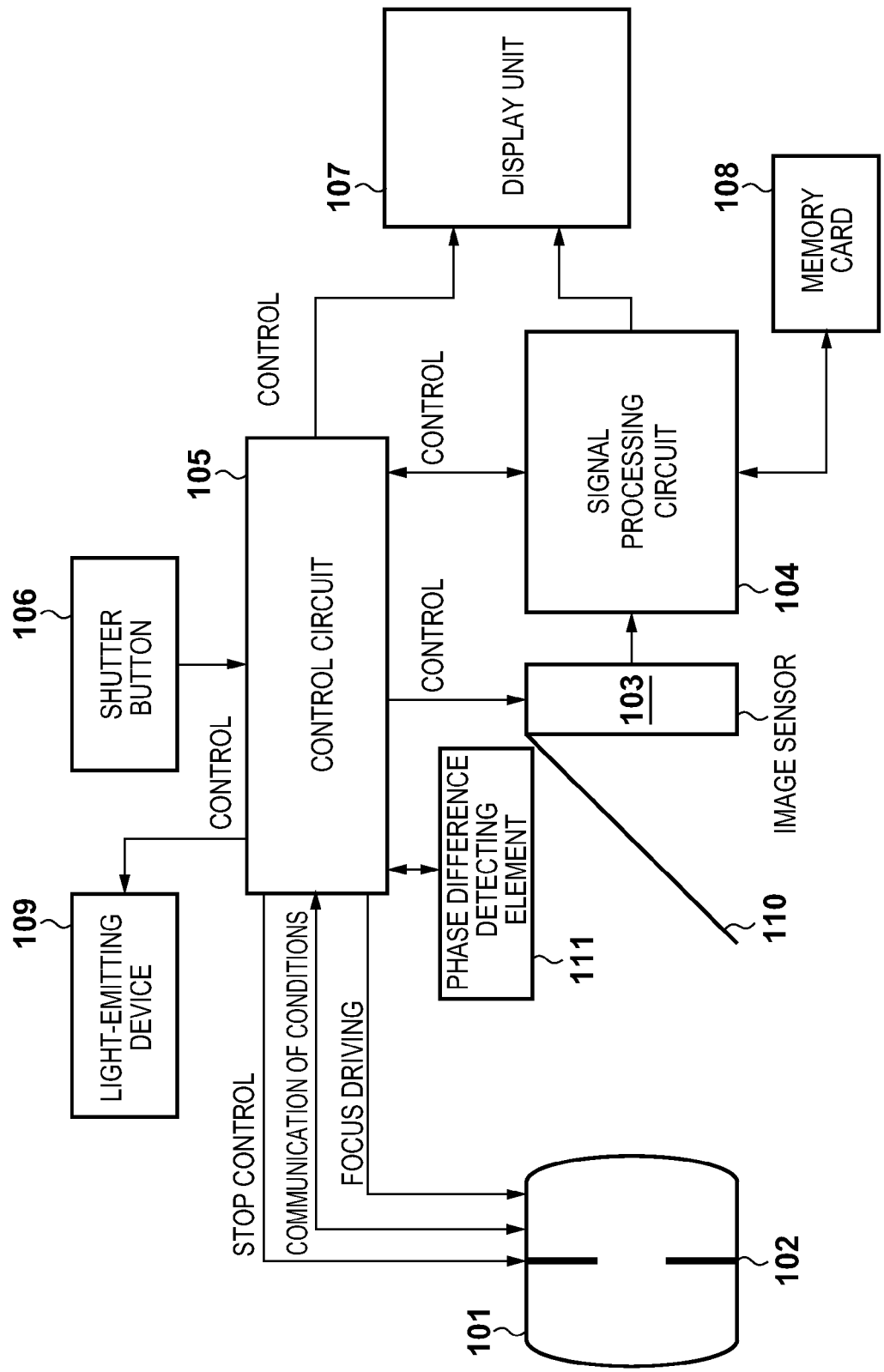

|   | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | 6 | 6 | 7 | 7 | 7 | 7 |   |   |   |   |   |   | 8 | 7 | 7 | 7 | 6 | 5 |
| B | 6 | 6 | 7 | 7 | 7 | 7 |   |   |   |   |   |   | 7 | 7 | 7 | 7 | 6 | 5 |
| C | 6 | 6 | 7 | 7 | 7 | 7 | 9 |   |   |   |   | 9 | 7 | 7 | 7 | 7 | 6 | 5 |
| D | 6 | 6 | 7 | 7 | 7 | 7 | 9 |   |   |   |   | 9 | 7 | 7 | 7 | 7 | 6 | 5 |
| E | 5 | 5 | 6 | 6 | 6 | 6 | 8 |   |   |   |   | 8 | 6 | 6 | 6 | 6 | 5 | 4 |
| F | 5 | 5 | 6 | 6 | 6 | 6 | 8 |   |   |   |   | 8 | 6 | 6 | 6 | 6 | 5 | 4 |
| G | 5 | 5 | 6 | 6 | 6 | 6 | 8 |   |   |   |   | 8 | 6 | 6 | 6 | 6 | 5 | 4 |
| H | 5 | 5 | 6 | 6 | 6 | 6 | 8 |   | 4 | 4 |   | 8 | 2 | 2 | 6 | 6 | 5 | 4 |
| I | 5 | 5 | 6 | 6 | 6 | 6 | 8 |   | 4 | 4 |   | 8 | 2 | 2 | 6 | 6 | 5 | 4 |
| J | 5 | 5 | 6 | 6 | 6 | 6 | 3 | 4 | 4 | 4 | 4 | 3 | 2 | 2 | 2 | 6 | 5 | 4 |
| K | 3 | 3 | 3 | 3 | 3 | 3 | 3 | 3 | 3 | 3 | 3 | 3 | 2 | 2 | 2 | 3 | 3 | 3 |
| L | 2 | 2 | 2 | 2 | 2 | 2 | 2 | 2 | 2 | 2 | 2 | 2 | 2 | 2 | 2 | 2 | 2 | 2 |

IMAGE CAPTURE APPARATUS AND METHOD OF CONTROLLING THE SAME

BACKGROUND OF THE INVENTION

1. Field of the Invention

The present invention relates to an image capture apparatus which can perform image capturing by using a light-emitting device.

2. Description of the Related Art

Many conventional image capture apparatuses use a system which performs so-called pre-flash before image capturing to determine the amount of light emission at the time of image capturing, when capturing an object image by using a light-emitting device, and determines the amount of light emission at the time of image capturing by performing photometry of reflected light from an object at the time of pre-flash.

The image capture apparatus disclosed in Japanese Patent Laid-Open No. 2001-21961 receives, via an image sensor, reflected light from an object at the time of pre-flash which has passed through an imaging lens, and determines a proper amount of light emission by using an output from the image sensor. If an object is located at a near distance and an output from the image sensor exceeds a predetermined value, this apparatus stops down the imaging lens and performs pre-flash again. The apparatus then determines the amount of light emission from a proper output from the image sensor.

The photometry device of the camera disclosed in Japanese Patent Laid-Open No. 6-130462 is compatible with photometry in a wide luminance range which is performed by alternately repeating photometry with a long accumulation period of an image sensor and photometry with a short accumulation period.

However, according to the conventional technique disclosed in Japanese Patent Laid-Open No. 2001-21961, when an object is located a short distance at the time of pre-flash and an output from the image sensor exceeds a predetermined value, the imaging lens is stopped down, and pre-flash is performed again. For this reason, depending on object distance conditions, it is necessary to perform pre-flash a plurality of times to determine the light amount of main light emission.

The conventional technique disclosed in Japanese Patent Laid-Open No. 6-130462 needs to perform pre-flash at least twice to perform photometry twice with short and long accumulation periods. In addition, since a short accumulation period is a preset accumulation period, the image sensor is saturated depending on the distance relationship with an object, resulting in a failure to properly determine the light amount of main light emission.

SUMMARY OF THE INVENTION

The present invention has been made in consideration of the above problems, and provides an image capture apparatus which can determine a proper light amount of main light emission by performing pre-flash once when capturing an object image by using a light-emitting device.

According to the first aspect of the present invention, there is provided an image capture apparatus comprising: an image sensor; an acquisition unit which acquires information concerning distances to objects in a plurality of areas in an image capturing area; and a control unit which controls a charge accumulation period for each of a plurality of segmented areas of the image sensor, wherein the plurality of areas for which information concerning distances to the objects are acquired by the acquisition unit respectively correspond to the plurality of segmented areas, and the control unit controls the charge accumulation periods for the respective segmented areas at the time of light emission by a light-emitting device based on the information concerning the distances to the objects in the corresponding areas.

According to the second aspect of the present invention, there is provided an image capture apparatus comprising: an image sensor; an acquisition unit which acquires information concerning distances to objects in a plurality of areas in an image capturing area; and a control unit which controls a sensitivity for each of a plurality of segmented areas of the image sensor, wherein the plurality of areas for which information concerning distances to the objects are acquired by the acquisition unit respectively correspond to the plurality of segmented areas, and the control unit controls the sensitivities for the respective segmented areas at the time of light emission by a light-emitting device based on the information concerning the distances to the objects in the corresponding areas.

According the third aspect of the present invention, there is provided a method of controlling an image capture apparatus having an image sensor, an acquisition unit which acquires information concerning distances to objects in a plurality of areas in an image capturing area, the method comprising: a control step of controlling a charge accumulation period for each of a plurality of segmented areas of the image sensor, wherein the plurality of areas for which information concerning distances to the objects are acquired by the acquisition unit respectively correspond to the plurality of segmented areas, and the control step controls the charge accumulation periods for the respective segmented areas at the time of light emission by a light-emitting device based on the information concerning the distances to the objects in the corresponding areas.

According to the fourth aspect of the present invention, there is provided a method of controlling an image capture apparatus having an image sensor, an acquisition unit which acquires information concerning distances to objects in a plurality of areas in an image capturing area, the method comprising: a control step of controlling a sensitivity for each of a plurality of segmented areas of the image sensor, wherein the plurality of areas for which information concerning distances to the objects are acquired by the acquisition unit respectively correspond to the plurality of segmented areas, and the control step controls the sensitivities for the respective segmented areas at the time of light emission by a light-emitting device based on the information concerning the distances to the objects in the corresponding areas.

Further features of the present invention will become apparent from the following description of exemplary embodiments with reference to the attached drawings.

BRIEF DESCRIPTION OF THE DRAWINGS

FIG. 1 is a block diagram showing the arrangement of an image capture apparatus according to the first embodiment of the present invention;

DESCRIPTION OF THE EMBODIMENTS

Figures 2A, 2B:
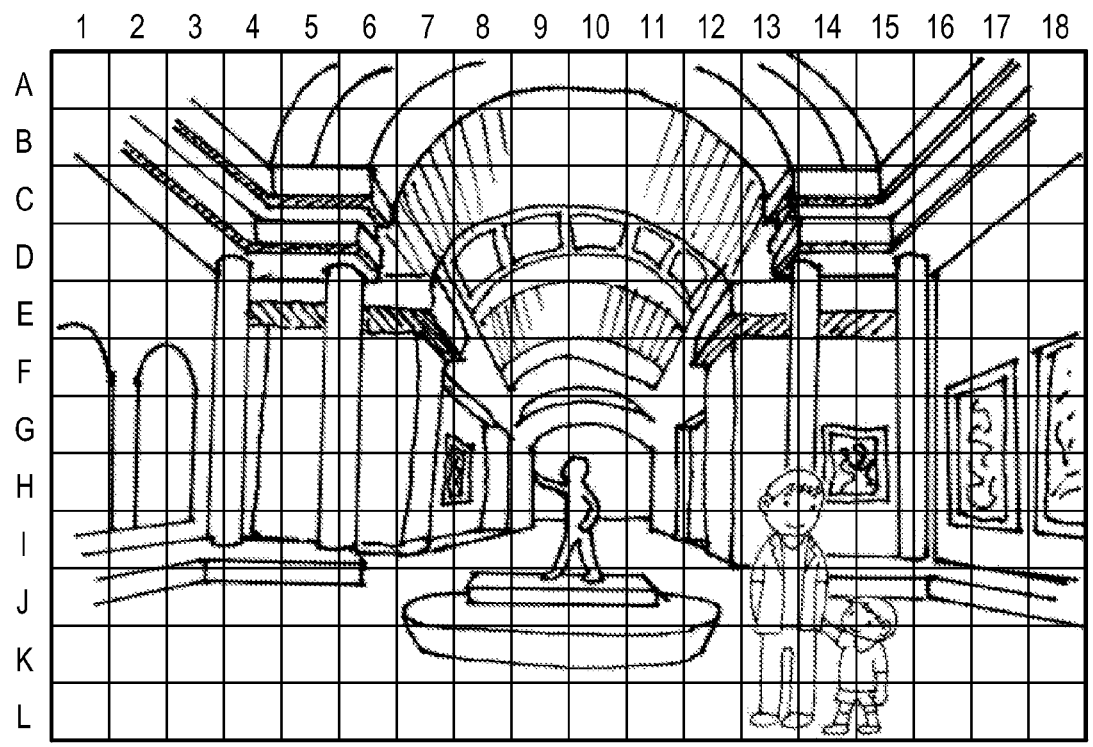
FIGS. 2A and 2B are views respectively showing how photometry is performed on an object and area segmentation for distance measurement is performed.

The embodiments of the present invention will be described in detail below with reference to the accompanying drawings.

First Embodiment

FIG. 1 is a block diagram showing the arrangement of an image capture apparatus according to the first embodiment of the present invention. Referring to FIG. 1, reference numeral 101 denotes a lens (imaging lens); 102, a stop incorporated in the lens 101; 103, an image sensor; 104, a signal processing circuit; 105, a controller; 106, a shutter button; 107, a display unit such as a TFT liquid crystal display; 108, a detachable memory card; 109, a light-emitting device; 110, a half mirror; and 111, a phase difference detecting element. Note that the lens 101 and the light-emitting device 109 need not be incorporated in the image capture apparatus and may be detachable with the image capture apparatus.

The operation of the image capture apparatus having the above arrangement will be described below. The lens 101 forms an object image (not shown) on the image sensor 103. In addition, the half mirror 110 reflects the object image to also form it on the phase difference detecting element 111. The phase difference detecting element 111 can independently extract light beams which have passed through different regions of the exit pupil of the lens 101, and reads the light beams which have passed through the different regions of the exit pupil with respect to a plurality of areas inside an image frame (an image capturing area). The controller 105 can obtain phase difference information of each area by performing predetermined processing for the signals read from the phase difference detecting element 111.

The stop 102 and focus driving operation of the lens 101 are controlled by signals from the controller 105. The focal length information, focus position information, and the like of the lens 101 are read in accordance with control signals from the controller 105. The controller 105 estimates the position of an object (the distance to the object) in each area based on the above phase difference information and information concerning the distance to the object such as the focal length information and focus position information read from the lens 101. The controller 105 then sets an accumulation period (charge accumulation period) for each area of the image sensor 103 before pre-flash in consideration of the opening information (information concerning an aperture value) of the stop 102 in addition to the estimation result. When, for example, changing the amount of light emission for pre-flash based on the opening information of the stop 102, the controller 105 need not consider the opening information of the stop 102 in setting an accumulation period for each area of the image sensor 103.

When performing pre-flash, the controller 105 sets the amount of light emission and a light emission scheme for the light-emitting device 109. The controller 105 selects, as the amount of light emission, the light amount of light that does not cause saturation of the pixels of the image sensor 103, based on the aperture value of the lens 101 in use, the object distance of an area including the nearest object, and the set accumulation periods. The controller 105 also selects, as a light emission scheme, constant light amount light emission (light emission with an almost constant light amount during a light emission time) to cover the accumulation periods for all the areas of the image sensor 103. That is, the controller 105 performs pre-flash with an almost constant light amount in the interval from the start of charge accumulation of an area, of the areas of the image sensor 103, which starts first charge accumulation to the end of charge accumulation of an area, of the areas of the image sensor 103, which starts last charge accumulation. A light emission scheme such as FP light emission is suitable as constant light amount light emission.

The lens 101 projects flash light (reflected light) reflected by an object at the time of pre-flash on the image sensor 103. The image sensor 103 photo-electrically converts the projected image to read it as an electrical signal. The signal processing circuit 104 performs predetermined processing for the read electrical signal. The controller 105 then reads the resultant signal as a luminance integral value for each area.

The controller 105 refers to the aperture value information, focal length information, and focus position information read from the lens 101, the accumulation period for each area set in the image sensor 103, and the luminance integral value for each area read from the signal processing circuit 104. The controller 105 then calculates a pre-flash result for each area and determines the light amount of main light emission (the amount of light emission at the time of image capturing).

FIGS. 2A and 2B show how photometry is performed on an object and how area segmentation for distance measurement is performed. FIG. 2A shows how an object image is segmented. FIG. 2B shows the distance information of each area. Although distance information is obtained from a phase difference detection result on each area, a lens focal length, and focus position information, each area where the lens focus position is at the infinity position is set to a blank because of incapability of distance determination. As is obvious from FIGS. 2A and 2B, the front floor portion and the parent and child on the right front portion of the frame are at a distance of about 2 m, the statue in the center is at a distance of 4 m, and the rear side of the corridor is at the infinity position.

Figure 3:
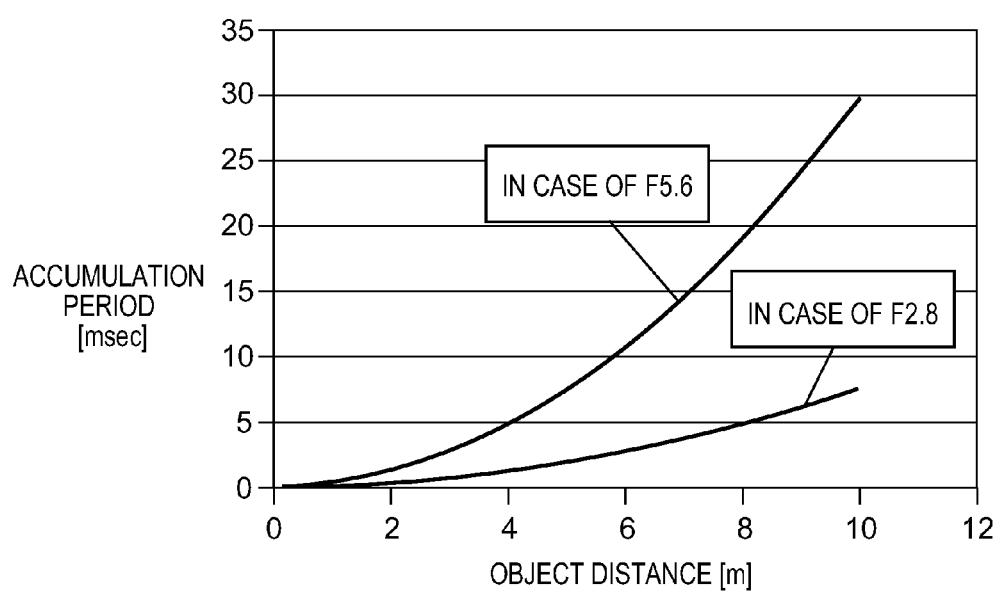
FIG. 3 is a graph showing accumulation period settings for the respective distances.

An accumulation period for each area is set in proportion to the square of the distance information of each area. FIG. 3 shows accumulation period settings in correspondence with the respective object distances. The shorter the distance to an object, the shorter the accumulation period, and vice versa. That is, the charge accumulation period for an area whose distance to an object is the first distance is set to be relatively longer than that for an area whose distance to the object is the second distance which is shorter than the first distance. It is assumed that any area whose lens focus position is the infinity position will not receive any pre-flash light even if the light amount of pre-flash is maximized. For this reason, it is not necessary to prolong the accumulation period at the time of pre-flash. It is therefore possible to refrain from prolonging the accumulation period more than necessary for any area whose lens focus position is the infinity position when setting an accumulation period equal to or less than the accumulation period for an area corresponding to the longest accumulation period among those for other areas. In addition, for any area whose lens focus position is near the infinity position (the distance to the object is longer than a predetermined distance) as well as any area whose lens focus position is the infinity position, it is possible to set an accumulation period equal to or less than the accumulation period for an area corresponding to the longest accumulation period among those for other areas. For any area whose object distance is unknown, it is possible to set an accumulation time equal to or less than the accumulation period for an area corresponding to the longest accumulation period among those for other areas. Necessary accumulation periods are set to different values in accordance with the full aperture value of the lens in use such that the product of a light beam reaching the image sensor and the accumulation period remains the same. Furthermore, when determining the light amount of main light emission, the apparatus determines the light amount in disregard of the information of any areas whose object distances are shorter than the minimum shooting distance of the lens in use.

On the other hand, if an overall frame is dark and the illuminance is equal to or less than the phase difference detection limit, it is impossible to determine an object distance. In this case, the apparatus sets the accumulation period for the overall frame to a time determined in advance in accordance with the focal length and aperture value of a lens in use so as to set the same time for each area. In addition, the apparatus determines the light amount of main light emission by performing pre-flash upon setting the light amount of pre-flash to the amount of light emission determined in advance in accordance with the focal length and aperture value of the lens in use.

Figure 4:
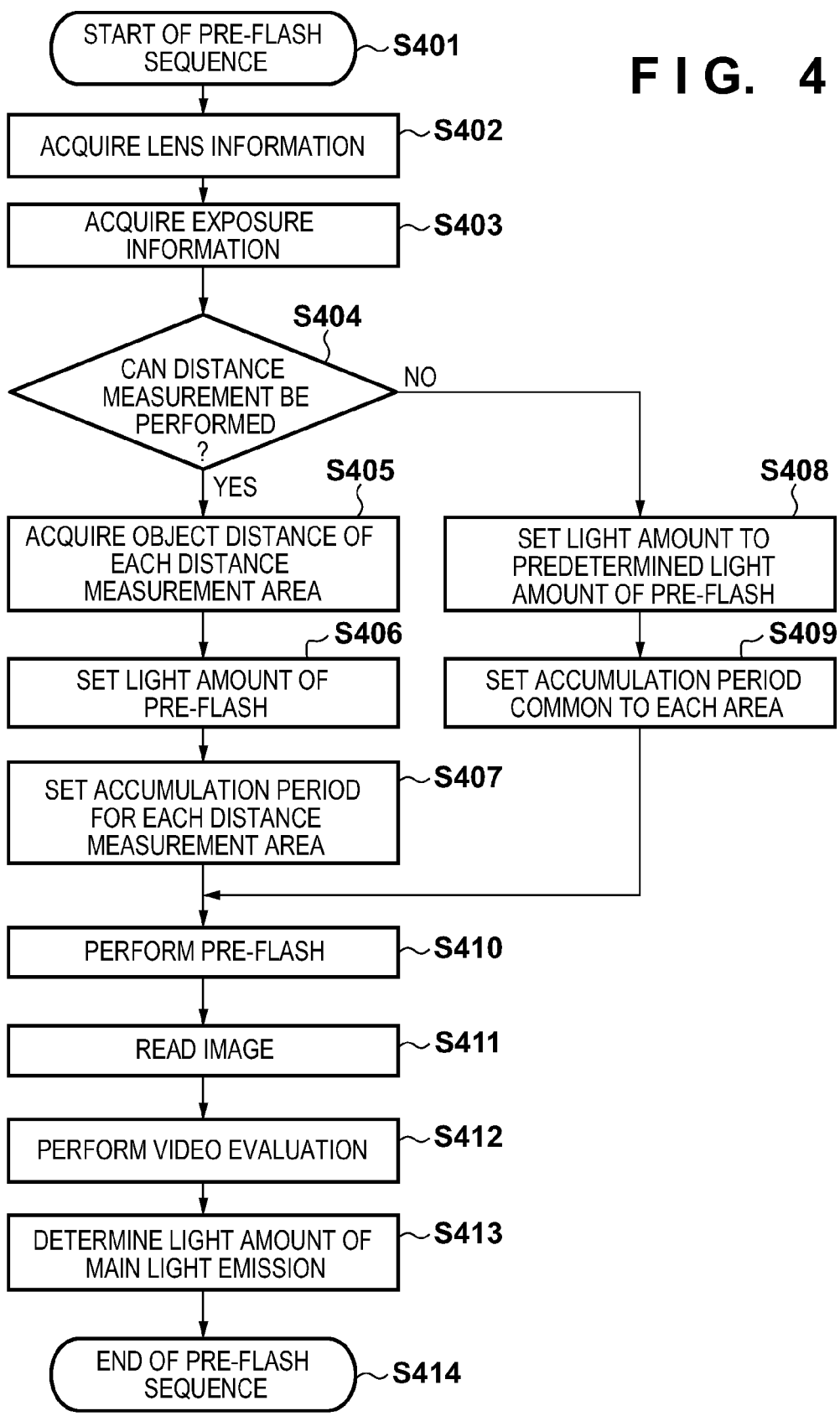
FIG. 4 is a flowchart showing an operation sequence in the first embodiment.

FIG. 4 is a flowchart showing an operation sequence in the image capture apparatus according to the first embodiment of the present invention. This sequence will be described with reference to FIG. 4.

When starting a pre-flash sequence (step S401), the controller 105 acquires lens information such as a focal length and a focus position from the lens 101 (step S402), and further acquires exposure information based on the electrical signal read from the image sensor 103 (step S403). The controller 105 then determines whether it is possible to perform distance measurement from the lens information and the exposure information (step S404). If it is possible to perform distance measurement (YES in step S404), the controller 105 acquires an object distance in each distance measurement area as described above (step S405). The controller 105 then sets the light amount of pre-flash in accordance with the object distance of each distance measurement area (step S406) and an accumulation period for each area of the image sensor 103 (step S407).

Upon determining in step S404 that it is not possible to perform distance measurement (NO in step S404), the controller 105 sets a predetermined light amount of pre-flash (step S408) and an accumulation period common to each area (step S409). The controller 105 controls the light-emitting device 109 and the image sensor 103 to perform pre-flash with the light amount of pre-flash and the accumulation period determined in steps S406 and S407 or steps S408 and S409 (step S410). When the accumulation period set upon pre-flash has elapsed, the controller 105 reads an image signal from the image sensor 103 (step S411).

The signal processing circuit 104 and the controller 105 perform video evaluation with respect to the read image signal (step S412). The controller 105 determines the light amount of main light emission (step S413) and terminates the pre-flash sequence (step S414).

Figure 5:
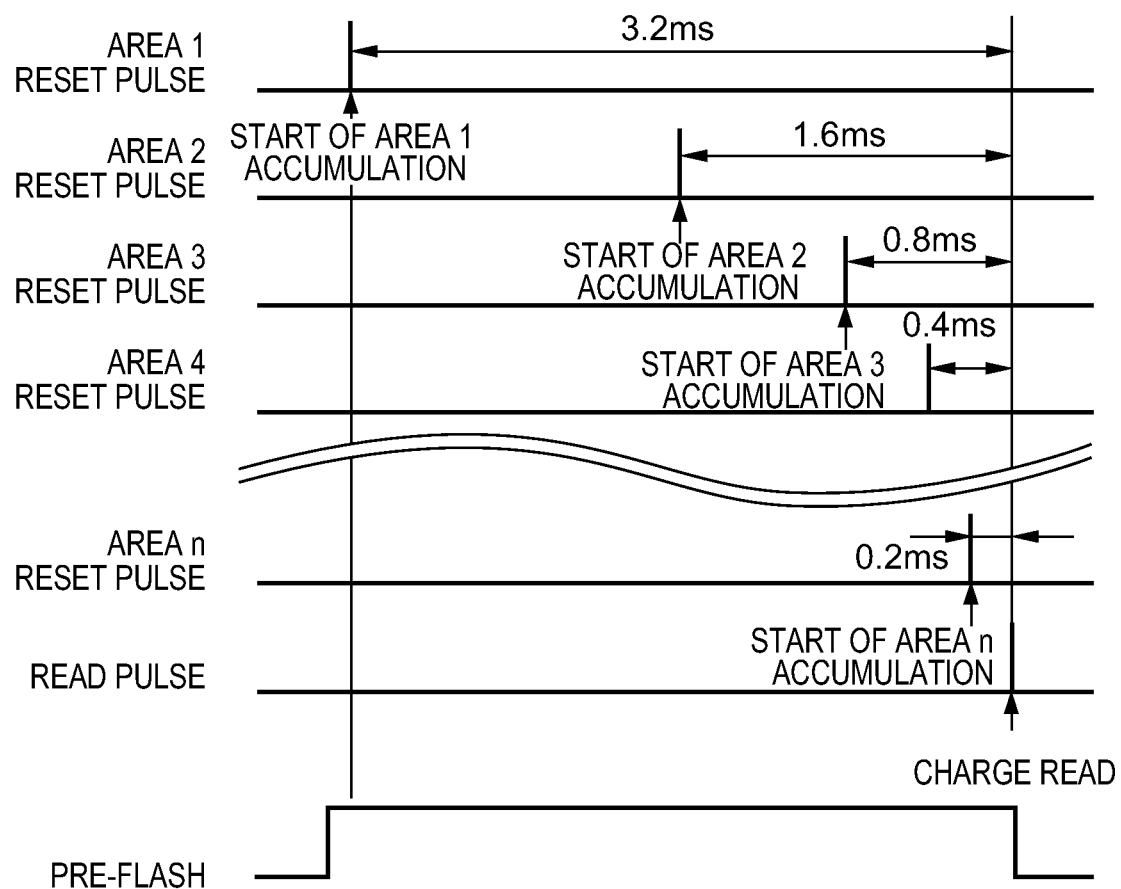
FIG. 5 is a timing chart showing accumulation period control on an image sensor.

FIG. 5 is a timing chart indicating a method of controlling an accumulation period for each area of the image sensor 103. The apparatus independently supplies a reset pulse to each of areas 1 to n on the image sensor. The area to which a reset pulse is supplied resets the charge which has been accumulated in the photodiodes so far, and then performs charge accumulation.

The charge accumulated in the photodiodes in each area is read by a read pulse. In this case, a reset pulse is supplied to each area so as to set a desired accumulation period with respect to a read pulse. In the case shown in FIG. 5, the apparatus controls reset pulses to set the following accumulation periods: 3.2 ms in area 1, 1.6 ms in area 2, 0.8 ms in area 3, 0.4 ms in area 4, and 0.2 ms in area n.

The apparatus starts pre-flash in expectation of the time required to stabilize the light amount before the supply of a reset pulse to an area which starts charge accumulation at the earliest pre-flash timing, and finishes the pre-flash at the timing of supplying a read pulse at the end of charge accumulation.

Note that this embodiment has exemplified the progressive scan image sensor typified by a CCD type image sensor. However, it is possible to obtain the same effects as those described above from a line-sequential scan image sensor typified by a CMOS type image sensor by controlling the relationship between a reset pulse for each row and a read pulse in the same manner as described above.

The arrangement of the embodiment described above sets an accumulation period optimal for each area based on a distance measurement result for each area before pre-flash by providing the image sensor 103 capable of controlling an accumulation period for each area and the distance measuring unit capable of performing distance measurement for each area of an object. In addition, performing pre-flash with a constant light amount in an interval including the longest set accumulation period can determine a proper light amount of main light emission.

Second Embodiment

Figure 6:
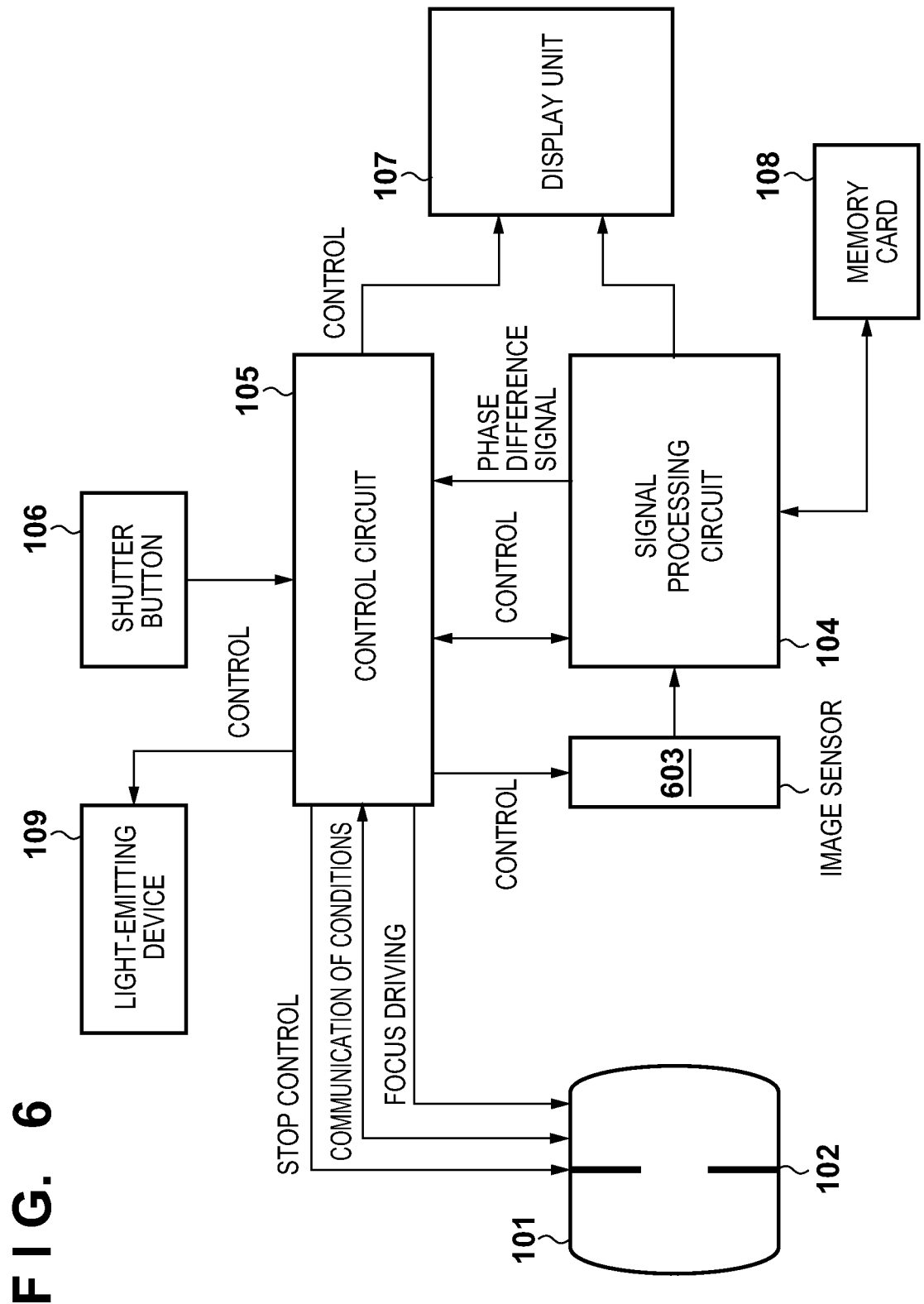
FIG. 6 is a block diagram showing the arrangement of an image capture apparatus according to the second embodiment of the present invention.

FIG. 6 is a block diagram showing the arrangement of an image capture apparatus according to the second embodiment of the present invention. Note that since the arrangement of the second embodiment is common in many respects to that of the first embodiment. Therefore, the same reference numerals as in FIG. 1 denote the same members, and a description of them will be omitted. Reference numeral 603 denotes an image sensor having a phase difference detection function.

The second embodiment is the same as the first embodiment in the basic operation of determining the light amount of main light emission from object distance determination through pre-flash. However, the second embodiment provides phase difference detecting pixels on the image sensor 603 instead of using the half mirror 110 and the phase difference detecting element 111.

Figure 7:
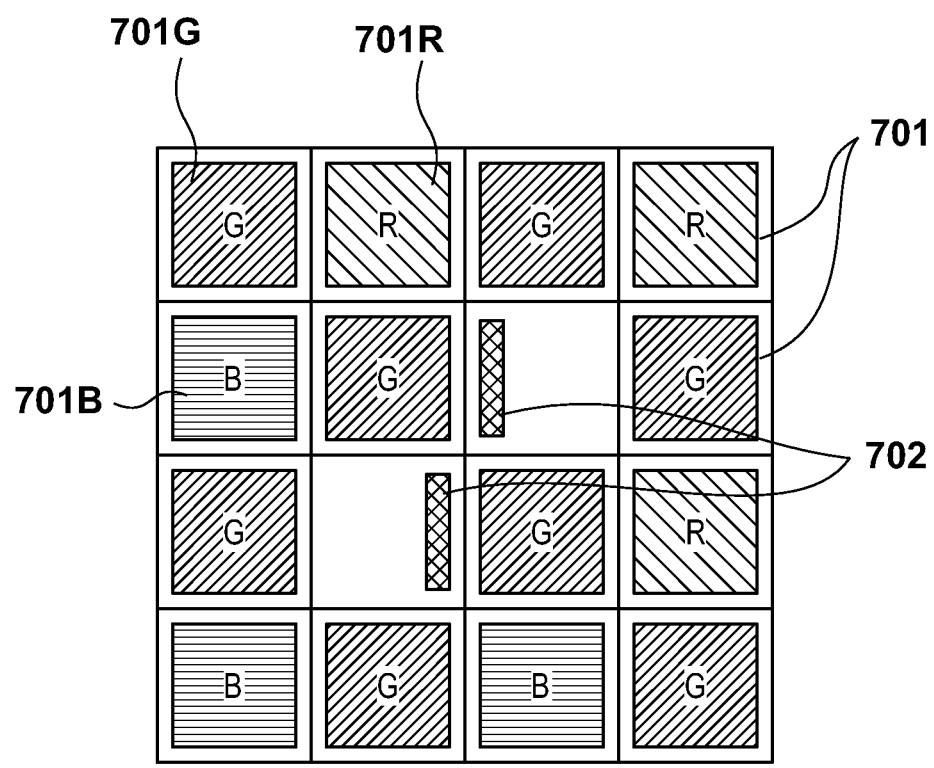
FIG. 7 is a view showing the pixel placement of an image sensor used in the second embodiment.

FIG. 7 shows the state of the pixels of the image sensor 603 used in this embodiment. As normal pixels 701 for image acquisition, this sensor includes an R pixel 701R on which an R filter which transmits red light is stacked, a G pixel 701G on which a G filter which transmits green light is stacked, and a B pixel 701B on which a B filter which transmits blue light is stacked. The sensor also includes phase difference detecting pixels 702. The phase difference detecting pixels 702 have slit-like openings formed at positions offset to the left and right in the pixel regions.

Figures 8A, 8B:
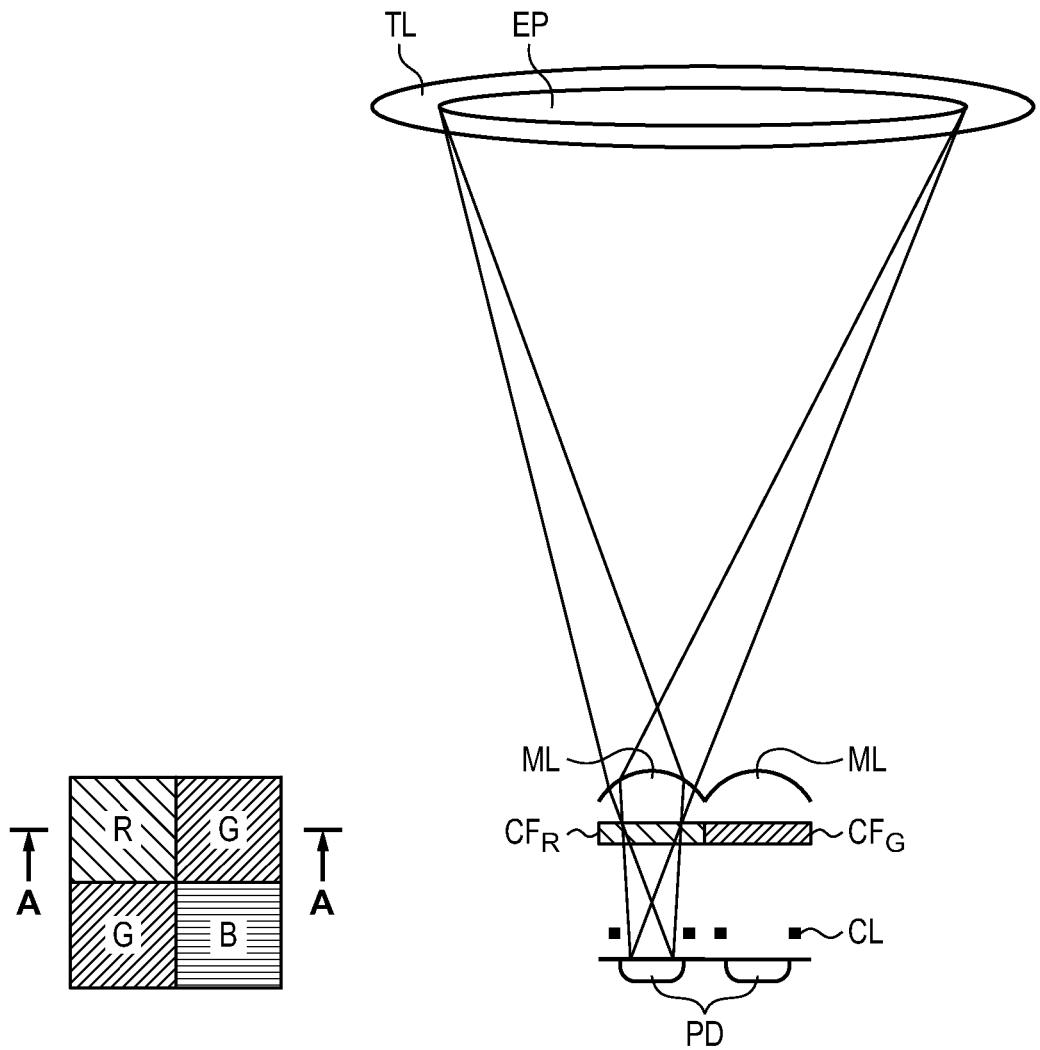
FIGS. 8A and 8B are views showing the placement and structure of image forming pixels.

FIGS. 8A and 8B show the placement and structure of image forming pixels. FIG. 8A is a plan view of image forming pixels in a 2 row×2 column matrix. As is well known, in a Bayer arrangement, G pixels are arranged diagonally, and R and B pixels are arranged as the two remaining pixels. 2 row×2 column structures are repeatedly arranged.

FIG. 8B is a sectional view taken along a line A-A in FIG. 8A. Reference symbol ML denotes an on-chip microlens disposed on the forefront surface of each pixel; CFR, an R (red) color filter; CFG, a G (green) color filter; PD (Photo Diode), a photo-electric conversion element (schematically shown in FIG. 8B) of a CMOS image sensor; CL (Contact Layer), a wiring layer for forming signal lines which transmit various kinds of signals in the CMOS image sensor; TL (Taking Lens), an imaging optical system schematically shown as a lens 101; and EP (Exit Pupil), the exit pupil of the lens 101.

In this case, the on-chip microlens ML and photo-electric conversion element PD of an image forming pixel are configured to capture a light beam passing through the imaging optical system TL as effectively as possibly. In other words, the exit pupil EP of the imaging optical system TL and the photo-electric conversion element PD have a conjugate relationship via the microlens ML, and the photo-electric conversion element is designed to have a large effective area. Although the light beam entering the R pixel has been described with reference to FIG. 8B, the G and B (blue) pixels have the same structure as that described above. Therefore, the exit pupil EP corresponding to each of the image forming pixels R, G, and B has a large diameter, and efficiently captures a light beam (photons) from an object, thereby increasing the S/N ratio of an image signal.

Figures 9A, 9B:
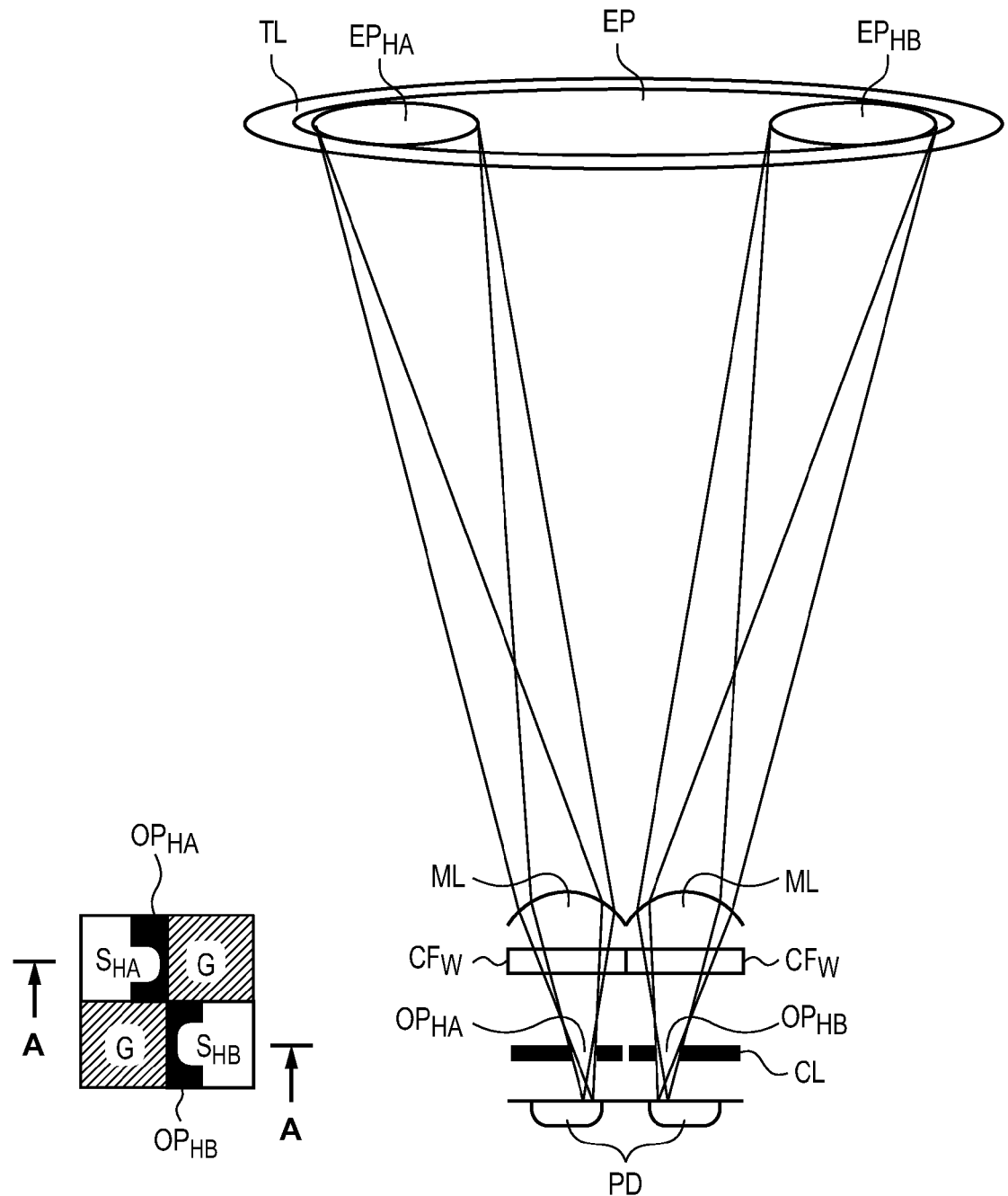
FIGS. 9A and 9B are views showing the placement and structure of focus detecting pixels.

FIGS. 9A and 9B show the arrangement and structure of focus detecting pixels for performing pupil division of the imaging optical system in the horizontal direction (lateral direction). In this case, the horizontal direction or lateral direction indicates a direction along a straight line which is perpendicular to the optical axis of an imaging optical system and extends in the horizontal direction when an image capture apparatus is positioned such that the optical axis of the image capture apparatus and a long side of an image frame become parallel to the ground. In addition, the pupil division direction in FIGS. 9A and 9B is the horizontal direction. FIG. 9A is a plan view of pixels in a 2 row×2 column matrix including focus detecting pixels. When obtaining an image signal for recording or enjoyment, the apparatus acquires the main component of luminance information via each G pixel. Since the human image recognition characteristics are sensitive to luminance information, a loss of G pixels makes it easy to notice a deterioration in image quality. In contrast, R or B pixels are pixels for the acquisition of color information (color difference information). The human visual characteristics are insensitive to color information. Even if, therefore, several pixels to acquire color information are lost, a deterioration in image quality is hard to notice. In this embodiment, of pixels in a 2 row×2 column matrix, G pixels are left as image forming pixels, and R and B pixels are replaced by focus detecting pixels. Referring to FIG. 9A, reference symbols SHA and SHB denote these focus detecting pixels.

FIG. 9A is a sectional view taken along a line A-A in FIG. 9B. FIG. 9B shows a state in which the diameter of the exit pupil EP of the imaging optical system TL is ready for phase difference detection in this embodiment. The microlens ML and the photo-electric conversion element PD have the same structure as that of the image forming pixel shown in FIG. 8B. In this embodiment, since a signal from a focus detecting pixel is not used for the generation of an image, a transparent film CFW (white) is used in place of a color separation color filter. In addition, since the image sensor performs pupil division, the position of each opening portion of the wiring layer CL shifts in one direction relative to the centerline of the microlens ML. More specifically, an opening portion OPHA of the pixel SHA shifts rightward, and hence receives a light beam having passed through an exit pupil EPHA on the left side of the imaging optical system TL. Likewise, an opening portion OPHB of the pixel SHB shifts leftward, and hence receives a light beam having passed through an exit pupil EPHB on the right side of the imaging optical system TL. Therefore, an object image acquired by a plurality of pixels SHA regularly arrayed in the horizontal direction will be defined as image A. An object image acquired by a plurality of pixels SHB regularly arrayed in the horizontal direction will be defined as image B. Detecting the relative positions of images A and B can detect the out-of-focus amount (defocus amount) of the object image.

Note that the pixels SHA and SHB can perform focus detection with respect to an object having a luminance distribution in the lateral direction of an image frame, for example, a vertical line, but cannot perform focus detection with respect to a horizontal line having a luminance distribution in the longitudinal direction. Therefore, to detect a focus state in the latter case as well, this embodiment can include pixels for pupil division in the vertical direction (longitudinal direction) of the imaging optical system.

Using the image sensor 603 having the above arrangement allows the controller 105 to acquire the phase difference information of light beams at different position on the exit pupil of the imaging lens as in the case of using phase difference detecting pixels. That is, it is possible to acquire information concerning the distances to objects in a plurality of areas in an image frame.

The arrangement of this embodiment eliminates the necessity to use any independent phase difference detecting pixels by providing phase difference detecting pixels on the image sensor. This contributes to reductions in the sizes and costs of devices, and allows to perform distance measurement while observing video signals from the image sensor.

Third Embodiment

Figure 10:
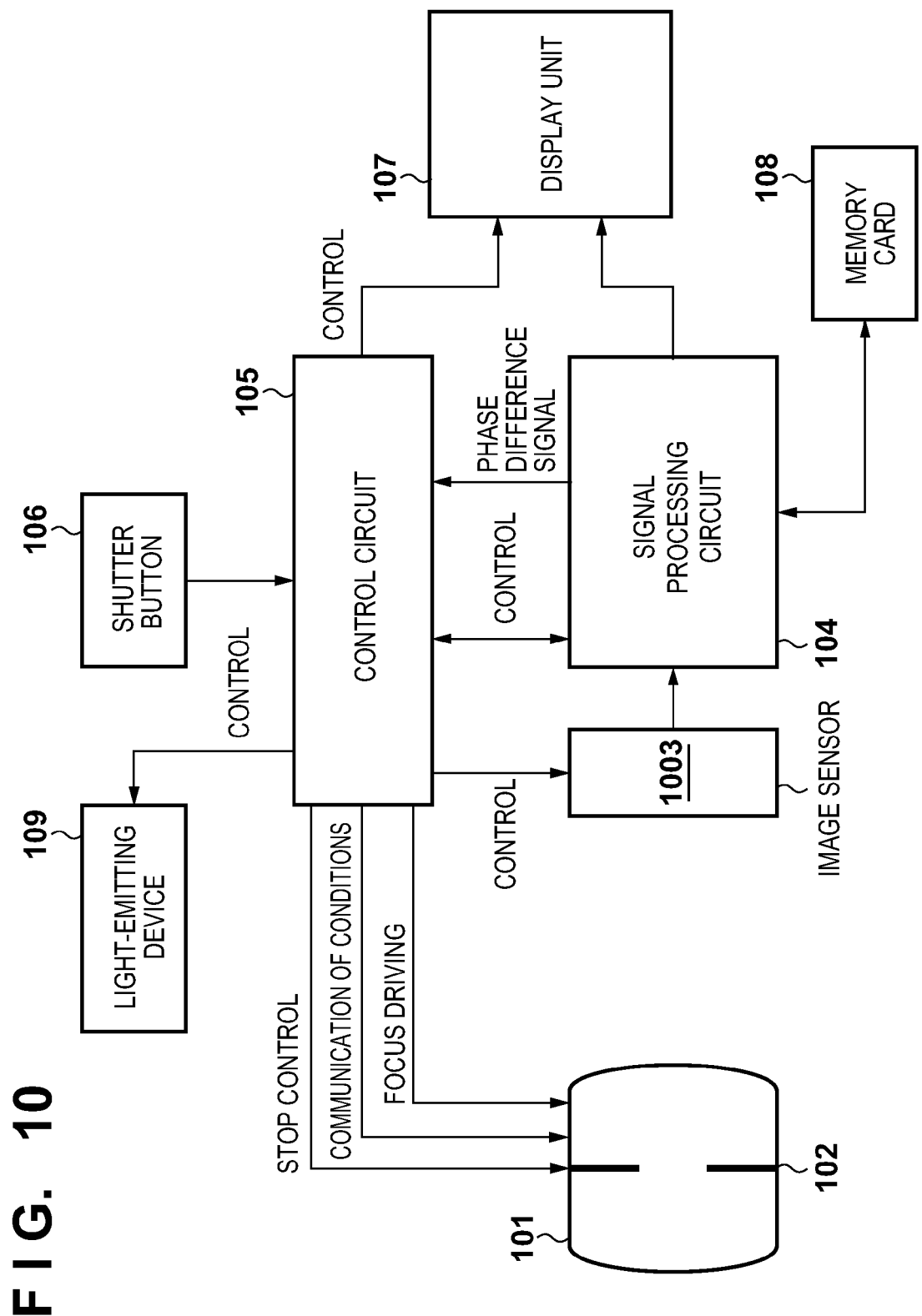
FIG. 10 is a block diagram showing the arrangement of an image capture apparatus according to the third embodiment of the present invention.

FIG. 10 is a block diagram showing the arrangement of an image capture apparatus according to the third embodiment of the present invention. Note that since the arrangement of the third embodiment is common in many respects to that of the second embodiment shown in FIG. 6. Therefore, the same reference numerals as in FIG. 6 denote the same members, and a description of them will be omitted. Reference numeral 1003 denotes an image sensor having a phase difference detection function, which differs from the structure of an image sensor 603 according to the second embodiment.

The third embodiment is the same as the second embodiment in the basic operation of determining the light amount of main light emission from object distance determination through pre-flash. In the third embodiment as well, phase difference detecting pixels are provided on the image sensor 1003.

Figure 11A:
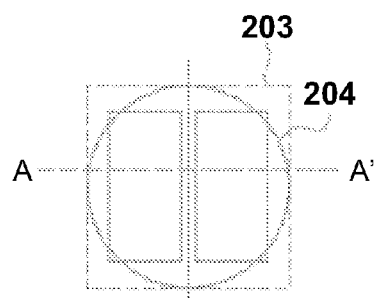
FIGS. 11A, 11B, and 11C show the structure of an image sensor used in the third embodiment.
Figure 11B:
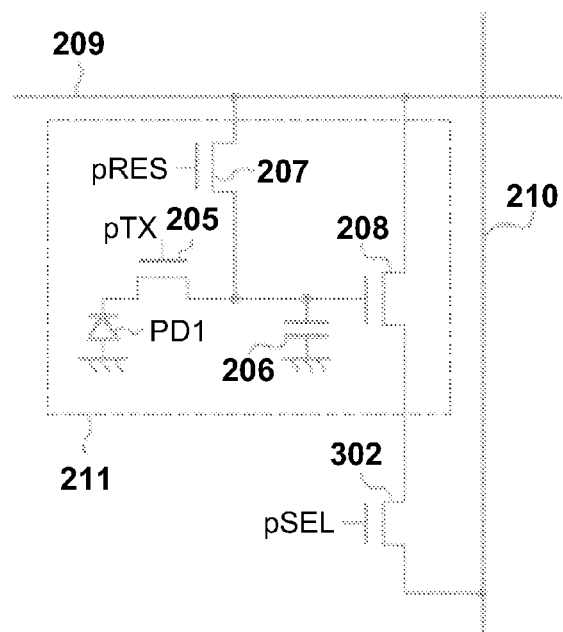
Figure 11C:
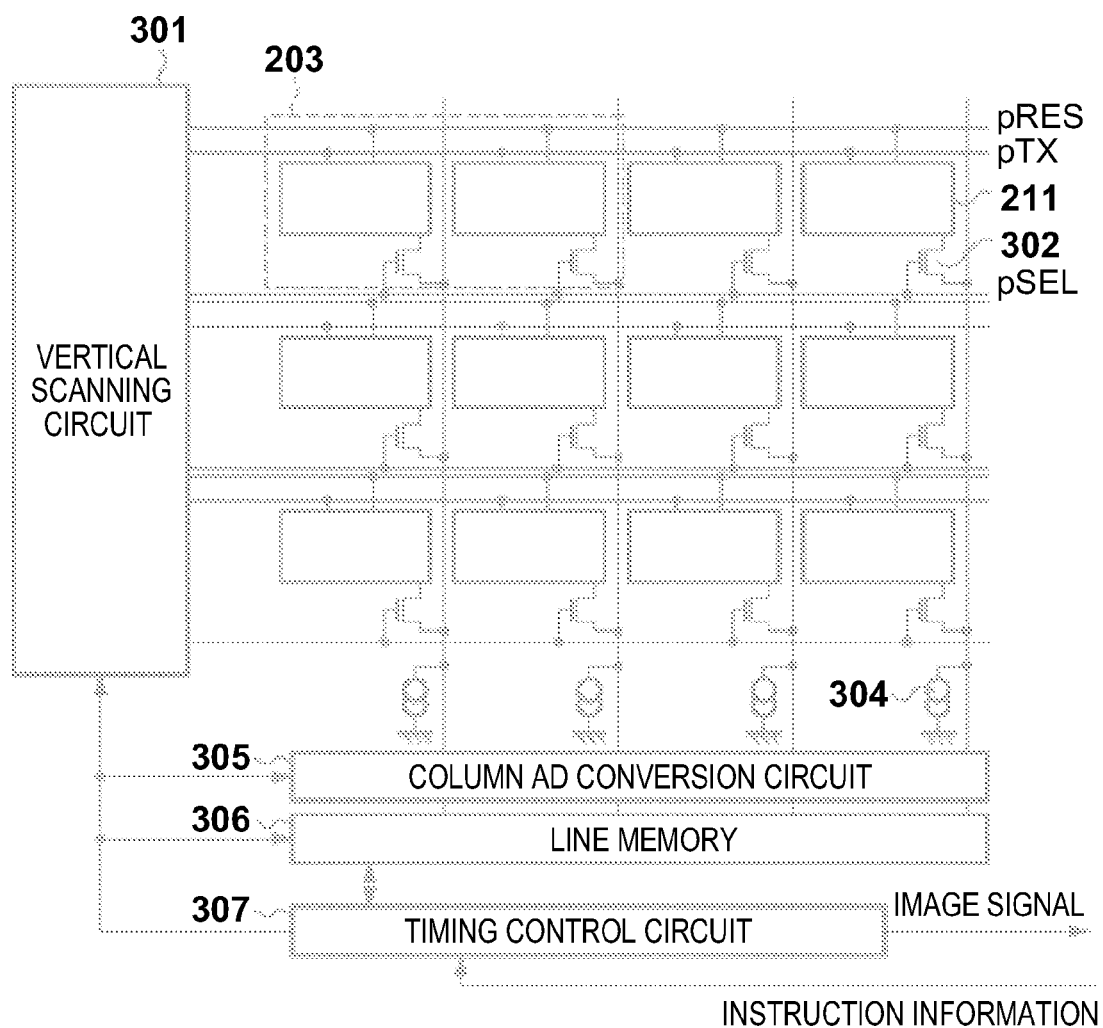

FIGS. 11A, 11B, and 11C show the state of the pixels of the image sensor 1003 used in this embodiment.

FIG. 11A is a plan view schematically showing one pixel 203, which includes a plurality of photo-electric conversion units each typified by a photodiode which converts incident light into charge. FIG. 11A shows a case in which the pixel 203 includes two photo-electric conversion units PD1 and PD2, and one microlens 204 common to the photo-electric conversion units PD1 and PD2. Assume that photo-electric conversion units PD1 and PD2 exist in each of the remaining pixels of the image sensor 1003 in the positional relationship shown in FIG. 11A. With this arrangement, the photo-electric conversion units PD1 and PD2 receive light beams passing through different areas of the exit pupil of an optical system 101.

FIGS. 11B and 11C are circuit diagrams of the image sensor 1003. FIG. 11B is a circuit diagram of a circuit (to be referred to as a "half pixel unit" hereinafter) 211 according to one of the photo-electric conversion units constituting the pixel 203. FIG. 11C shows the overall arrangement including the pixel 203. Although FIG. 11B shows the half pixel unit 211 including the photo-electric conversion unit PD1, the half pixel unit including the photo-electric conversion unit PD2 has the same arrangement. That is, one half pixel unit of the pixel 203 includes the photo-electric conversion unit PD1, and the other half pixel unit includes the photo-electric conversion unit PD2. FIG. 11C shows the pixels 203 in a 3 row×2 column matrix (that is, half pixel units 211 in a 3 row×4 column matrix) for the sake of easy understanding. However, in practice, several ten thousands to several hundred thousands pixels 203 are arranged two-dimensionally at a predetermined aspect ratio. In addition, each pixel 203 may be covered with a color filter with one of R, G, and B hues. For example, R, G, and B color filters may be arranged in a Bayer arrangement.

Referring to FIG. 11B, reference numeral 206 denotes floating diffusion unit (FD) serving as an accumulation area for temporarily accumulating the charge generated by the photo-electric conversion unit PD1; 205, a transfer switch which transfers the charge generated by the photo-electric conversion unit PD1 to an FD 206 in response to a transfer pulse pTX; 207, a reset switch which removes the charge accumulated in the FD 206 in response to a reset pulse pRES; 208, an amplification MOS amplifier functioning as a source-follower amplifier; and 302, a selection switch for selecting a column. As shown in FIG. 11C, the gates of the transfer switch 205, the reset switch 207, and the selection switch 302 are connected to signal lines which supply the pulses pTX, pRES, and pSEL for each row. A vertical scanning circuit 301 selectively scans these switches. The drains of a reset switch 207 and amplification MOS amplifier 208 are connected to a power supply line 209.

Referring to FIG. 11C, reference numeral 304 denotes a constant current source serving as a load on the amplification MOS amplifier 208. The half pixel unit 211 and the constant current source 304 are connected to a column AD conversion circuit 305 via a signal output line 210 for each column. The FD 206, the amplification MOS amplifier 208, and the constant current source 304 constitute a floating diffusion amplifier. The signal charge of the pixel selected by the selection switch 302 is converted into a voltage, which is then output to the column AD conversion circuit 305 via the signal output line 210.

The column AD conversion circuit 305 is a circuit which converts the voltage signal output from the half pixel unit 211 into a digital code. In general, this circuit is configured to compare a voltage signal with ramp waveform via a comparator, start a counter at the start of a ramp waveform output, and convert a counter value obtained when a voltage signal coincides with a ramp waveform into a digital code. Reference numeral 306 denotes a line memory which stores, as a digital signal, an output from the half pixel unit 211 which is converted into a digital code by the column AD conversion circuit 305. A timing control circuit 307 outputs a digital signal stored in the line memory 306 as an image signal based on instruction information sent from an instruction information generation unit 106. The timing control circuit 307 is configured to simultaneously read out the digital signals obtained by the photo-electric conversion units PD1 and PD2 of each pixel 203 from the line memory 306, add them by signal processing, and output the resultant signal, or output the respective digital signals obtained by the photo-electric conversion units PD1 and PD2.

Using the image sensor 1003 having the above arrangement allows the controller 105 to acquire phase difference information of light beams at different positions on the pupil of the imaging lens as in the case of using phase difference detecting pixels. That is, it is possible to acquire information concerning the distances to objects in a plurality of areas in an image frame.

According to the arrangement of this embodiment, providing phase difference detecting pixels on an image sensor eliminates the necessity to use an independent phase difference detecting elements. This contributes to reductions in the sizes and costs of devices, and allows to perform distance measurement while observing video signals from the image sensor.

In the above three embodiments, the accumulation period of each image sensor at the time of pre-flash by the light-emitting device is controlled based on information concerning the distances to objects. It is however possible to control the accumulation period of the image sensor at the time of main light emission by the light-emitting device based information concerning the distances to objects.

In addition, in the above three embodiments, the accumulation period of the image sensor at the time of light emission by the light-emitting device based on information concerning the distances to objects. However, the controller 105 may control the sensitivity of the image sensor in the same manner as control on the accumulation period of the image sensor. For example, the controller 105 may decrease the sensitivity with a decrease in distance to an object, and may increase the sensitivity with an increase in distance to an object. In addition, it is possible to equalize the sensitivities in the respective, areas if the distances to objects in all the areas in an image frame are unknown. Furthermore, if the distances to objects in some areas of a plurality of areas in an image frame are unknown, the controller 105 may set the sensitivity in an area whose distance to an object is unknown to the highest sensitivity of the sensitivities in areas whose distances to objects are known.

Furthermore, the controller 105 may control both the accumulation period and sensitivity of the image sensor at the time of light emission by the light-emitting device based on information concerning the distances to objects.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-191070, filed. Sep. 1, 2011, which is hereby incorporated by reference herein in its entirety.

What is claimed is:
1. An image capture apparatus comprising:
an image sensor; and
at least one control circuit to perform, acquiring respective information corresponding to distances to objects in a plurality of areas in an image capturing area based on signals which are read from a phase difference detecting member and controlling respective charge accumulation periods for each of a plurality of segmented areas of said image sensor during a time of light emission by a light-emitting device, wherein the plurality of areas in the image capturing area for which information corresponding to distances to the objects are acquired by said at least one control circuit respectively correspond to the plurality of segmented areas, and wherein said at least one control circuit performs, controlling respective charge accumulation periods for each of the segmented areas corresponding to the plurality of areas in the image capturing area based on the respective information corresponding to the distances to the objects in the corresponding segmented areas.

2. The apparatus according to claim 1, wherein said at least one control circuit performs setting longer charge accumulation periods for each of segmented areas in accordance with longer distances to the objects based on the information corresponding to the distances to the objects in the corresponding areas in a plurality of areas in the image capturing area.

3. The apparatus according to claim 1, wherein said at least one control circuit performs setting a relatively longer charge accumulation period for a segmented area corresponding to an area of a plurality of areas in the image capturing area whose distance to an object based on the information corresponding to the distances to the objects is a first distance than a charge accumulation period for a segmented area corresponding to an area of a plurality of areas in the image capturing area whose distance to an object based on the information corresponding to the distances to the objects is a second distance shorter than the first distance.

4. The apparatus according to claim 1, wherein at least one control circuit performs controlling light emission for the light-emitting device with a substantially constant light emission intensity during charge accumulation for each of a plurality of segmented areas corresponding to a plurality of areas in the image capturing area in a predetermined interval.

5. The apparatus according to claim 4, wherein said at least one control circuit performs controlling charge accumulation periods for each of a plurality of segmented areas so as to start and finish charge accumulation in all of the segmented areas in an interval during which the light-emitting device performs light emission with a substantially constant light emission intensity.

6. The apparatus according to claim 1, wherein said at least one control circuit performs, acquiring information corresponding to distances to the objects for each of the plurality of areas in the image capturing area before pre-flash by the light-emitting device, and controlling charge accumulation periods for each of a plurality of segmented areas at the time of pre-flash by the light-emitting device based on the information corresponding to the distances to the objects which is acquired before pre-flash by the light-emitting device.

7. The apparatus according to claim 1, wherein the phase difference detecting member is pixels in said image sensor which is able to detect the phase difference.

8. The apparatus according to claim 1, wherein said at least one control circuit performs setting respective charge accumulation periods for each of a plurality of segmented areas to an equal time when distances to objects in all of a plurality of areas in the image capturing area are unknown.

9. The apparatus according to claim 1, wherein when distances to objects in some of a plurality of areas in the image capturing area are unknown, said at least one control circuit performs setting a charge accumulation period for a segmented area corresponding to an area whose distance to an object is unknown to a longest charge accumulation period of charge accumulation periods for segmented areas corresponding to areas whose distances to objects are known.

10. The apparatus according to claim 1, wherein when distances of some of a plurality of areas in the image capturing area to objects are longer than a predetermined distance, said at least one control circuit performs setting a charge accumulation period for a segmented area corresponding to an area whose distance to an object is longer than the predetermined distance to a longest charge accumulation period of charge accumulation periods for segmented areas corresponding to areas whose distances to objects are not longer than the predetermined distance.

11. The apparatus according to claim 6, wherein said at least one control circuit performs determining a light amount of main light emission by the light-emitting device based on a charge accumulation result obtained by said image sensor at the time of pre-flash by the light-emitting device.

12. An image capture apparatus comprising:
an image sensor; and
at least one control circuit to perform, acquiring respective information corresponding to distances to objects in a plurality of areas in an image capturing area based on signals which are read from a phase difference detecting member and controlling respective sensitivities for each of a plurality of segmented areas of said image sensor during a time of light emission by a light-emitting device, wherein the plurality of areas in the image capturing area for which information corresponding to distances to the objects are acquired by said at least one control circuit respectively correspond to the plurality of segmented areas, and wherein said at least one control circuit performs controlling respective sensitivities for each of the segmented areas corresponding to the plurality of areas in the image capturing area based on the respective information corresponding to the distances to the objects in the corresponding segmented areas.

13. The apparatus according to claim 12, wherein said at least one control circuit performs setting higher sensitivities for each of segmented areas in accordance with longer distances to the objects based on the information corresponding to the distances to the objects in the corresponding areas in a plurality of areas in the image capturing area.

14. The apparatus according to claim 12, wherein said at least one control circuit performs controlling respective sensitivities for each of a plurality of segmented areas at the time of light emission by the light-emitting device with a substantially constant light emission intensity in a predetermined interval based on the information corresponding to distances to the objects.

15. The apparatus according to claim 12, wherein said at least one control circuit performs acquiring information corresponding to distances to the objects for each of a plurality of areas in the image capturing area before pre-flash by the light-emitting device, and controlling sensitivities for each of a plurality of segmented areas at the time of pre-flash by the light-emitting device based on the information corresponding the distances to the objects which is acquired before pre-flash by the light-emitting device.

16. The apparatus according to claim 12, wherein the phase difference member is pixels in said image sensor which is able to detect the phase difference.

17. The apparatus according to claim 12, wherein said at least one control circuit performs setting respective sensitivities for each of a plurality of segmented areas to an equal sensitivity when distances to objects in all of a plurality of areas in the image capturing area are unknown.

18. The apparatus according to claim 12, wherein when distances to objects in some of a plurality of areas in the image capturing area are unknown, said at least one control circuit performs setting a sensitivity for a segmented area corresponding to an area whose distance to an object is unknown to a highest sensitivity of sensitivities for segmented areas corresponding to areas whose distances to objects are known.

19. A method of controlling an image capture apparatus having an image sensor, said method comprising:
acquiring respective information corresponding to distances to objects in a plurality of areas in an image capturing area based on signals which are read from a phase difference detecting member, and
controlling respective charge accumulation periods for each of a plurality of segmented areas of said image sensor during a time of light emission by a light-emitting device, and controlling respective charge accumulation periods for each of the segmented areas corresponding to the plurality of areas in the image capturing area based on the respective information corresponding to the distances to the objects in the corresponding segmented areas,
wherein the plurality of areas in the image capturing area for which information corresponding to distances to the objects which acquiring respectively correspond to the plurality of segmented areas.

20. A method of controlling an image capture apparatus having an image sensor, said method comprising:
acquiring respective information corresponding to distances to objects in a plurality of areas in an image capturing area based on signals which are read from a phase difference detecting member, and
controlling respective sensitivities for each of a plurality of segmented areas of said image sensor during a time of light emission by a light-emitting device, and controlling respective sensitivities for each of the segmented areas corresponding to the plurality of areas in the image capturing area based on the respective information corresponding to the distances to the objects in the corresponding segmented areas,
wherein the plurality of areas in the image capturing area for which information corresponding to distances to the objects which acquiring respectively correspond to the plurality of segmented areas.

21. The apparatus according to claim 1, wherein said at least one control circuit performs setting respectively different charge accumulation periods for each of segmented areas corresponding to an area of a plurality of areas in the image capturing area whose distance to an object based on the information corresponding the distances to an objects is a first distance and corresponding to an area of a plurality areas in the image capturing area whose distance to an object based on the information corresponding the distances to the objects is a second distance which is different from the first distance.

22. The apparatus according to claim 21, wherein said at least one control circuit performs controlling charge accumulation periods for each of segmented area corresponding to the first area and the second area so that a part of charge accumulation period corresponding to the first area and a part of charge accumulation period corresponding to the second area are overlapped.

23. The apparatus according to claim 1, wherein the information corresponding to distances to the objects is a distances from the apparatus to the objects.

24. The apparatus according to claim 1, wherein the information corresponding to distances to the objects is a defocus amount of the object image.

25. The apparatus according to claim 12, wherein said at least one control circuit performs setting respectively different sensitivities for each of segmented areas corresponding to an area of a plurality of areas in the image capturing area whose distance to an object based on the information corresponding to the distances to the objects is a first distance and corresponding to an area of a plurality of areas in the capturing area whose distance to an object based on the information corresponding to the distances to the objects is a second distance which is different from the first distance.

26. The apparatus according to claim 12, wherein the information corresponding to distances to the objects is a distance from the apparatus to the objects.

27. The apparatus according to claim 12, wherein the information corresponding to distances to the objects is a defocus amount of the object image.

28. An image capture apparatus comprising:
an image sensor; and
at least one control circuit to perform, acquiring respective information corresponding to distances to objects in a plurality of areas based on signals which are read from a phase difference detecting member and
controlling at least one of respective charge accumulation periods and respective sensitivities for each of a plurality of areas of said image sensor,
wherein the plurality of areas for which information corresponding to distances to the objects are acquired by said acquisition unit respectively correspond to the plurality of areas of said image sensor controlled by said at least one control circuit, and
wherein said at least one control circuit performs controlling at least one of respective charge accumulation periods and respective sensitivities for each of the plurality of areas of said image sensor corresponding to the plurality of areas based on the respective information corresponding to the distances to the objects in the corresponding plurality of areas.

29. The apparatus according to claim 28, wherein said at least one control circuit performs controlling at least one of respective charge accumulation periods and respective sensitivities for each of the plurality of areas of said image sensor during a time of light emission by a light-emitting device.

30. The apparatus according to claim 28, wherein said at least one control circuit performs acquiring respective information corresponding to distances to objects in the plurality of areas in an image capturing area.

31. A method of controlling an image capture apparatus having an image sensor, said method comprising:
acquiring respective information corresponding to distances to objects in a plurality of areas based on signals which are read from a phase difference detecting member, and
controlling at least one of respective charge accumulation periods and respective sensitivities for each of a plurality of areas of said image sensor, and
controlling at least one of respective charge accumulation periods and respective sensitivities for each of the plurality areas of said image sensor corresponding to the plurality of areas based on the respective information corresponding to the distances to the objects in the corresponding plurality of areas, wherein the plurality of areas for which information corresponding to distances to the objects which acquiring respectively correspond to the plurality of areas of said image sensor.

* * * * *